(12) United States Patent
Brunolli

(10) Patent No.: US 6,696,852 B1
(45) Date of Patent: Feb. 24, 2004

(54) LOW-VOLTAGE DIFFERENTIAL I/O DEVICE

(75) Inventor: Michael J. Brunolli, Escondido, CA (US)

(73) Assignee: Artisan Components, Inc., Santa Clara, CA (US)

(*) Notice: Subject to any disclaimer, the term of this patent is extended or adjusted under 35 U.S.C. 154(b) by 0 days.

(21) Appl. No.: 09/626,264

(22) Filed: Jul. 25, 2000

(51) Int. Cl.$^7$ .................. H03K 17/16; H03K 19/003
(52) U.S. Cl. .................................. 326/30; 326/86
(58) Field of Search ...................... 326/30, 86, 82, 326/27; 323/315; 327/108, 110, 112

(56) References Cited

U.S. PATENT DOCUMENTS

| | | | | |
|---|---|---|---|---|
| 5,216,297 A | * | 6/1993 | Proebsting | 326/73 |
| 5,726,592 A | | 3/1998 | Schulte et al. | 327/65 |
| 5,898,297 A | | 4/1999 | Bosnyak et al. | 323/315 |
| 5,926,031 A | * | 7/1999 | Wallace et al. | 326/30 |
| 5,939,904 A | * | 8/1999 | Fetterman et al. | 327/67 |
| 5,949,253 A | * | 9/1999 | Bridgewater, Jr. | 326/86 |
| 6,025,742 A | * | 2/2000 | Chan | 327/108 |
| 6,028,467 A | | 2/2000 | Burrows et al. | 327/331 |
| 6,037,798 A | * | 3/2000 | Hedberg | 326/30 |
| 6,194,949 B1 | | 2/2001 | Hogeboom | 327/391 |
| 6,198,307 B1 | * | 3/2001 | Garlepp et al. | 326/83 |
| 6,292,028 B1 | * | 9/2001 | Tomita | 326/86 |
| 6,313,662 B1 | * | 11/2001 | Ide | 326/83 |
| 6,356,141 B1 | * | 3/2002 | Yamauchi | 327/543 |
| 6,373,275 B1 | * | 4/2002 | Otsuka et al. | 326/30 |

FOREIGN PATENT DOCUMENTS

JP          1-273416     * 11/1989  ............ H03K/5/02

OTHER PUBLICATIONS

National Semiconductor "Product Folder, DS90LV048A", Jun. 1999.
National Semiconductor "LVDS Products, LVDS Product Family Introductions", Jun. 1999.
National Semiconductor "Product Folder, DS90LV031A", Jun. 1999.

* cited by examiner

Primary Examiner—Tuan T. Lam
(74) Attorney, Agent, or Firm—Pillsbury Winthrop LLP

(57) ABSTRACT

A low voltage differential I/O device and method is modeled using voltage sources and voltage dividers, rather than the current source and sink model of the prior art. In an exemplary implementation, a driver includes two pairs of transistors coupled between voltage sources, each pair associated with a respective logic state. Depending on the logic state to be signaled, one pair of transistors is driven strongly while the other pair is turned off. A differential voltage is established across the true and complement signal lines, the polarity of which is determined by which pair of transistors is driven, and the magnitude of which is readily determined by voltage division of the voltage sources across known resistances. The driver of the invention offers stable and low impedance across both logic states and common mode. Moreover, active devices and feedback are not required to establish a common mode voltage or impedance as in the prior art.

22 Claims, 6 Drawing Sheets

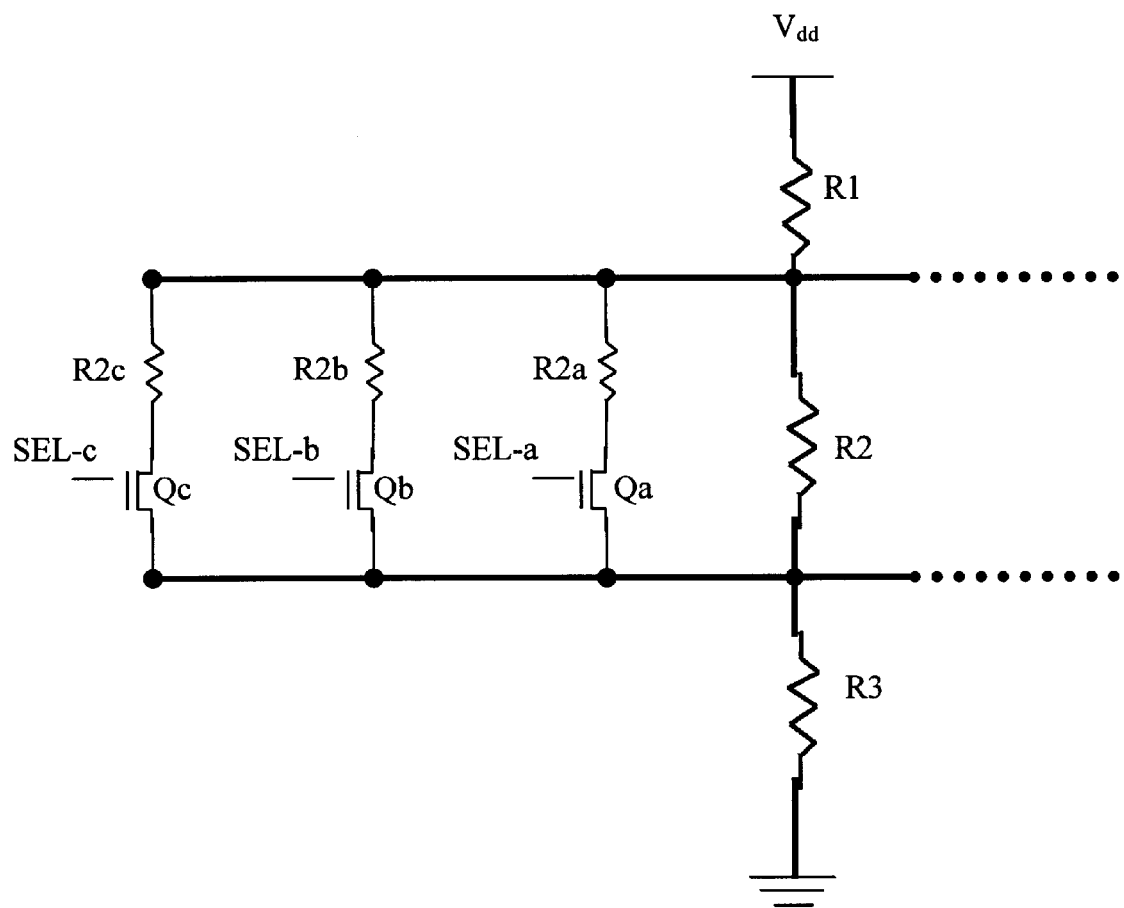
FIG. 8-A

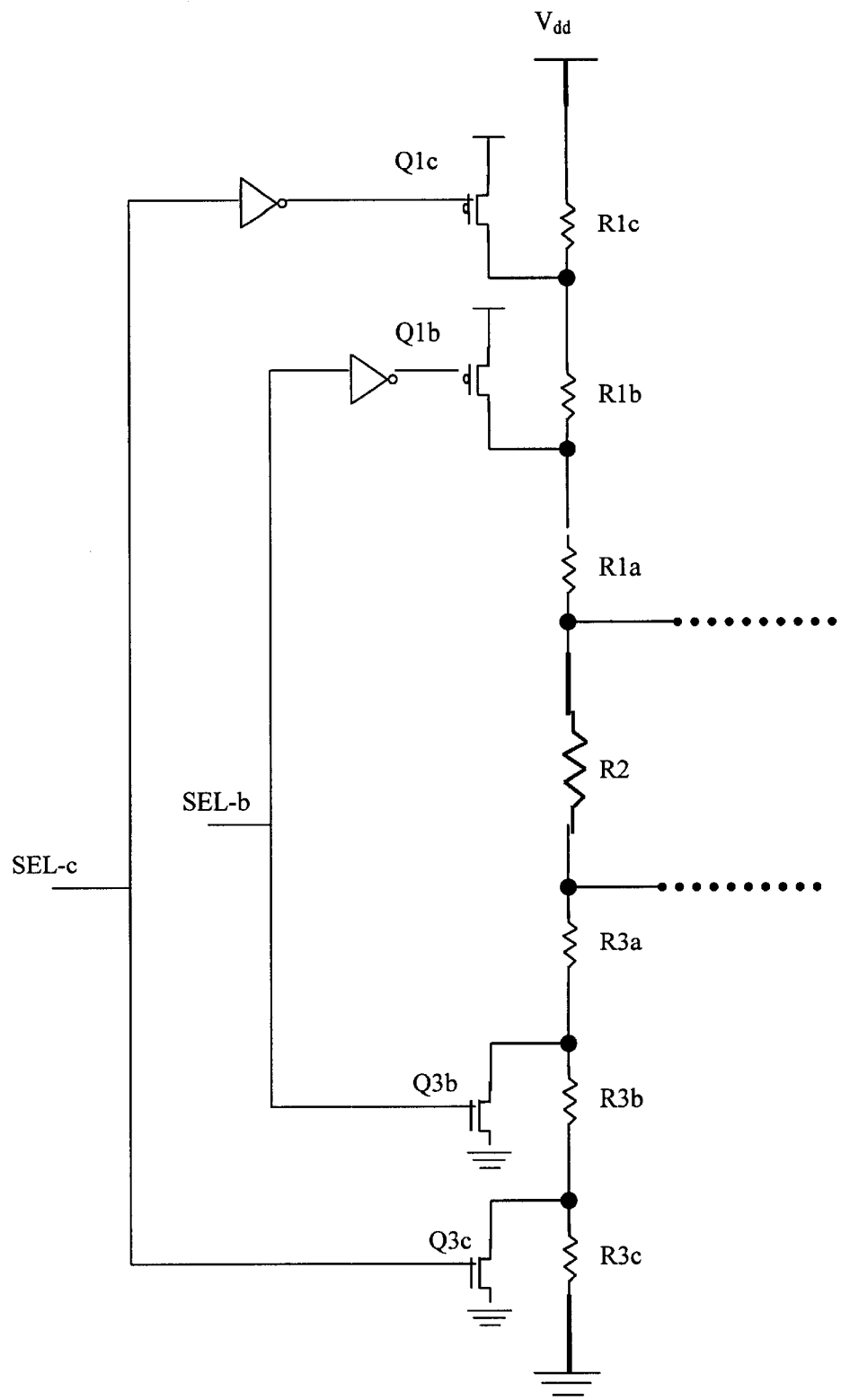
FIG. 8-B

LOW-VOLTAGE DIFFERENTIAL I/O DEVICE

BACKGROUND OF THE INVENTION

1. Field of the Invention

The present invention relates to data transmission devices, and more particularly, to low voltage differential signaling devices having desirable impedance and performance characteristics.

2. Description of the Related Art

Low Voltage Differential Signaling (LVDS) is a new technology aimed at high performance data transmission applications. LVDS technology features a low voltage differential signal of about 330 mV centered about a common-mode voltage of about 1.2V, compared to differential signals of about 0.6V–1.0V for PECL and about 2V–5V for RS-422 interfaces. With such low voltage swings, LVDS devices offer theoretical data rates in excess of 400 Mbps and relatively low power consumption (generally about 1.2 mW). In addition, LVDS allows for both DC and AC differences in ground reference voltage between the generator and receiver. This is accomplished by requiring the receiver to have a large input common mode range. Two key industry standards define LVDS: ANSI/TIA/EIA-644 and IEEE 1596.3.

Conventionally, LVDS drivers have been modeled as current mode devices, as illustrated in FIG. 1. As shown, the desired differential voltage $V_{diff}$ is achieved by causing a controlled current I to pass through termination resistor $R_{term}$ (typically about 100 Ω) at the receiver (via transmission lines having impedance $Z_T$). Accordingly, the desired differential voltage $V_{diff}$ between the true and complement signal lines 102 and 104 is determined as the product of $R_{term}$ *I. Thus, given a known termination resistance $R_{term}$, it is a matter of designing a circuit that will cause the correct current to flow through it and yield the desired voltage $V_{diff}$. In most conventional LVDS drivers, this is done by adjusting the conductive bias on active current source devices such as FETs. Signaling is achieved by changing the polarity of the current I flowing through the termination resistor, and thus the polarity of $V_{diff}$. Accordingly, much care has to be taken to properly design and implement biasing schemes.

In addition to required voltages to signal logic states, LVDS includes requirements concerning the "null" logic state, or "common-mode." For example, LVDS specifies that driver impedances Z1 and Z2 should be about the same, relatively constant and matched to the load, independent of the logic state, so that common-mode noise that propagates backward and reflects off the drivers does not get converted into differential noise by different reflection coefficients on the true and complement signal lines. Moreover, a "common-mode" reference needs to be established and stably maintained.

Modeling LVDS drivers as current sources and sinks has many drawbacks and leads to many challenges.

For example, a current source and sink model, by itself, does nothing to set the common mode reference. Accordingly, as illustrated in FIG. 2, a reference voltage $V_{cm}$ must be additionally provided with moderate impedance internal connections Rc1 and Rc2 thereto. The addition of Rc1 and Rc2 sets the common mode voltage and lowers the output impedance at the expense of increased power and complexity. If Rc1 and Rc2 are to provide perfect back termination (e.g. 100 ohms), then the current sources must provide twice the output current (i.e. doubling the power). Further, the demands on the voltage reference $V_{cm}$ are not trivial, and cannot be integrated with the buffer without a prohibitive increase in power or area (for decoupling). Also, common mode testing requires that the $V_{cm}$ supply both source and sink current. Therefore, $V_{cm}$ cannot be generated without some degree of shunt regulation, thus wasting additional power. Lastly, this approach could not be used for bidirectional signaling since the $V_{cm}$ supply would not allow input common mode to vary.

As another example, the common mode driver impedance according to the current source model becomes high and different than the driver impedance during signaling and as a result the common mode output voltage. So, as illustrated in FIG. 3, the prior art drivers typically add active feedback circuitry 302 to adjust the common mode voltage. However, this effectively lowers only the DC common mode driver impedance, at high frequency the delay in the circuit will result in reflections and additional artifacts.

Also, although adding such active devices can improve driver DC impedance, such a driver configuration is limited to point-to-point signaling. In other words, the transmission line associated with the driver can't be adapted to do bidirectional signaling with this configuration. This is because the active feedback could not be used to set the input impedance.

Another problem with the conventional driver of the prior art approach is that the driver impedance is high and not matched to either the transmission lines or the parasitic inductors, such as L1 and L2 in FIG. 3. The high impedance output will cause reflections of single ended or differential noise when driving transmission lines longer than ¼ wavelength of the highest frequency noise source. These reflections will then interfere with unrelated data at the receiver. When driving short transmission lines, the high output impedance will allow L1 and L2 to resonate with the output capacitance.

TMDS attempts to solve some of the above-described problems with conventional LVDS drivers. The TMDS approach is to try to control the input impedance of the driver. However, like FIG. 3, the TMDS driver has a high output impedance and thus has similar problems with respect to reflecting noise and damping parasitic impedance.

Accordingly, there remains a need in the art for a low-voltage differential I/O device and method the does not need voltage references to set common mode voltages and provides constant impedance in all logic states without the need for active feedback circuitry. The present invention fulfills this need, among others.

SUMMARY OF THE INVENTION

Accordingly, an object of the present invention is to effectively overcome the above-described problems of the prior art, among others.

Another object of the present invention is to provide a low voltage differential I/O device and method that does not rely on voltage references.

Another object of the present invention is to provide a low voltage differential I/O device and method that does not require active devices and feedback to set common mode voltages.

Another object of the present invention is to provide a low voltage differential I/O device and method that provides constant impedance for each logic state.

Another object of the present invention is to provide a low voltage differential I/O device and method that achieves higher signaling rates over conventional LVDS devices.

Another object of the present invention is to provide a low voltage differential I/O device and method that can detune output inductance.

To achieve these objects and others, a low voltage differential I/O device and method according to the invention is modeled using voltage sources and voltage dividers, rather than the current source and sink model of the prior art. In an exemplary implementation, a driver includes two pairs of transistors coupled between voltage sources, each pair associated with a respective logic state. Depending on the logic state to be signaled, one pair of transistors is driven strongly while the other pair is turned off. A differential voltage is established across the true and complement signal lines, the polarity of which is determined by the pair of transistors that is driven, and the magnitude of which is readily determined by voltage division of the voltage sources across known resistances. The driver of the invention offers stable and low impedance across both logic states and common mode. Moreover, active devices and feedback are not required to establish a common mode voltage or impedance as in the prior art.

BRIEF DESCRIPTION OF THE DRAWINGS

These and other objects and advantages of the present invention, along with the best mode for practicing it, will become apparent to those skilled in the art after considering the following detailed specification, together with the accompanying drawings wherein:

FIGS. 8-A and 8-B illustrate alternative models of the low differential driver of the present invention.

DETAILED DESCRIPTION OF THE INVENTION

Figure 4:
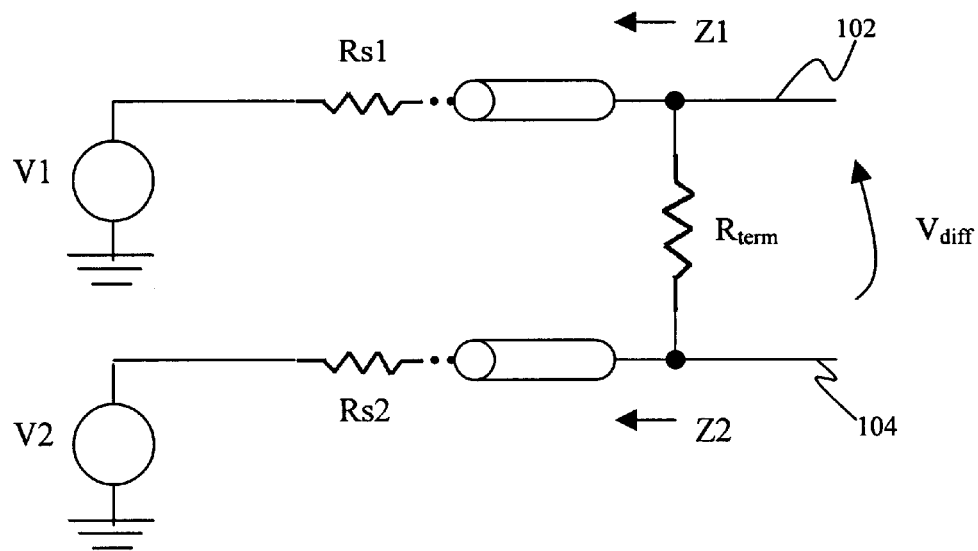
FIG. 4 illustrates a model of the low differential driver of the present invention.

The principles of the invention will now be described with reference to FIG. 4. As shown, a low-voltage differential I/O driver of the present invention is modeled using voltage sources rather than current sources and sinks. Specifically, voltage sources V1 and V2 are used to establish a voltage differential voltage $V_{diff}$ between the true and complement signal lines 102 and 104 across $R_{term}$.

Figure 5:
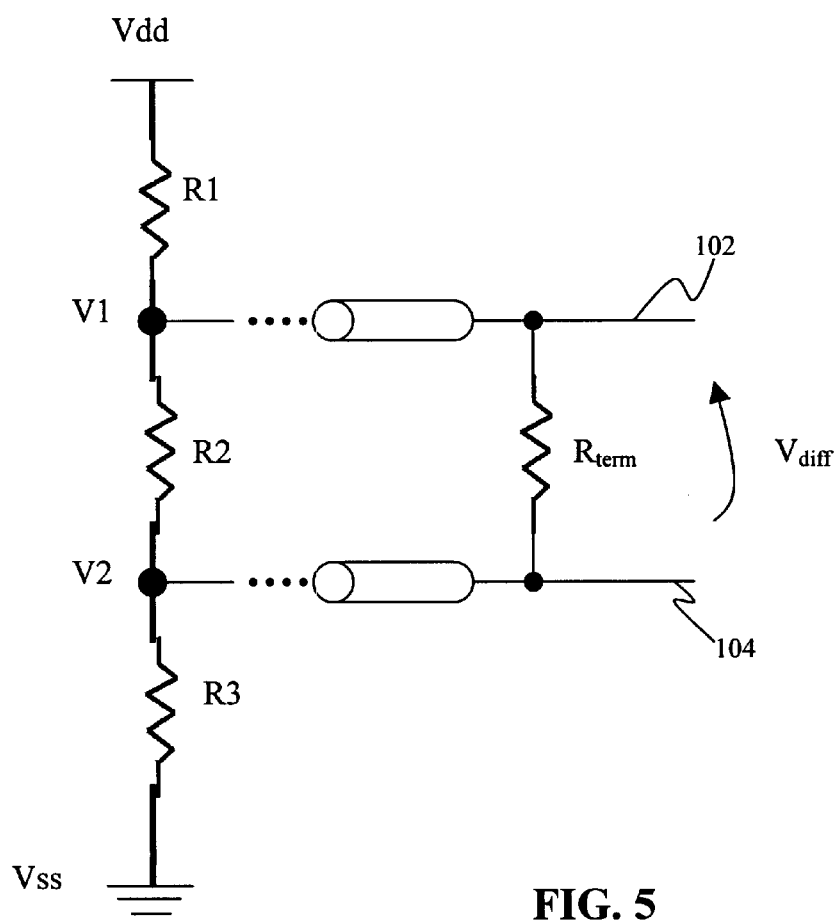
FIG. 5 illustrates an equivalent circuit of the low differential driver of the present invention.

The above model yields an equivalent circuit as shown in FIG. 5. As should be apparent, if the back termination is ideally matched to $R_{term}$, the desired differential voltage $V_{diff}$ is achieved in accordance with a standard voltage division of the difference between V1 and V2. Specifically, the desired differential voltage $V_{diff}$ between the true and complement signal lines 102 and 104 is determined as (V1−V2)/2.

Figure 6:
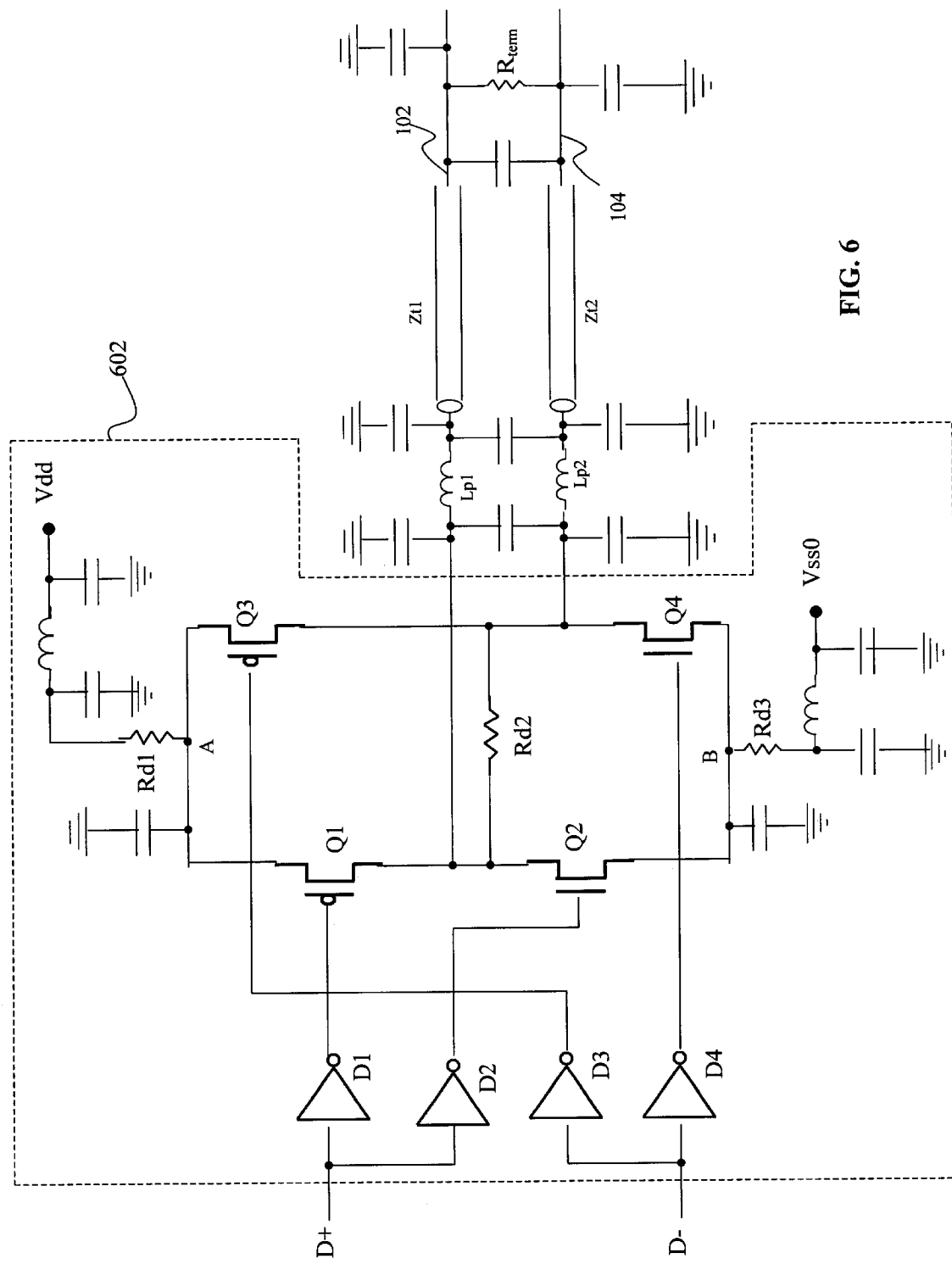
FIG. 6 illustrates an exemplary implementation of the low differential driver of the present invention.

FIG. 6 illustrates an example of a circuit that can be used to implement the model LVDS driver in accordance with the invention.

In this example, driver 602 includes PFETs Q1 and Q3 having a width/length (W/L) of about 600, NFETs Q2 and Q4 having a W/L of about 300, resistors Rd1, Rd2 and Rd3 having a resistance of about 150 ohms, with $V_{dd}$ being about 2.5 V and $V_{sso}$ being about 0V. Moreover, resistor $R_{term}$ has a resistance between 100 to 120 ohms, and Zt1 and Zt2 are transmission line impedances, such as PCB traces, of about 60 ohms each.

The parasitic capacitors and inductors are shown in FIG. 6 to provide a practical understanding of the invention to those skilled in the art. However, such parasitic devices can be effectively ignored for most purposes in the normal operating ranges of the present invention, where capacitors can be seen as open circuits and inductors can be seen as short circuits, except for certain aspects that will be explained in more detail below.

In the exemplary driver circuit shown in FIG. 6, when a differential signal having a first logic state, for example a "positive state", is desired to be transmitted, input D+ is set to a positive voltage (e.g. Vdd or 2.5V) and input D− is set to a zero voltage (e.g. Vss or 0V). This causes transistors Q1 and Q4 to turn on and transistors Q2 and Q3 to turn off, thus causing resistor Rd2 to be oriented in a conduction path between nodes A and B through transistors Q1 and Q4 such that a positive differential voltage of about 330 mV from common mode, is established between true and complement signal lines 102 and 104 due to the positive voltage drop across resistor Rd2.

It should be noted that the transistors in the driver of the present invention are designed so as to be driven strongly into conductance (i.e. "triode" or "linear" mode of operation), and not just saturation. This contrasts with the prior art, where circuits aim at providing a carefully controlled saturation-mode current through a termination resistor close to the receiver. In the present invention, therefore, transistors Q1, Q2, Q3 and Q4 are effectively operated as switches rather than voltage-controlled current sources as in the prior art, and the desired differential voltage is effectively established as a voltage division between resistors Rd2 and $R_{term}$.

When a differential signal having a second logic state, for example a "negative state", is desired to be transmitted, input D+ is set to a zero voltage (e.g. Vss or 0V) and input D− is set to a positive voltage (e.g. Vdd or 2.5V). This causes transistors Q2 and Q3 to turn on and transistors Q1 and Q4 to turn off, thus causing resistor Rd2 to be oriented in a conduction path between nodes A and B through transistors Q2 and Q3 such that a negative differential voltage of about 330 mV from common mode is established between the true and complement signal lines 102 and 104 due to the negative voltage drop across resistor Rd2.

It should be noted that the driver impedances Z1 and Z2 of driver 602 are going to be the same for all logicstates as well as for common mode due to the operation of transistors Q1, Q2, Q3 and Q4 and the constant impedances provided by Rd1, Rd2 and Rd3. Moreover, the desired common mode voltage is easily established in both logic states by operation of the driver itself when either transistors Q1 and Q4 are turned on and Q2 and Q3 are turned off or transistors Q2 and Q3 are turned on and Q1 and Q4 are turned off. Accordingly, it should be apparent that the common mode voltage Vcm will be determined by the difference between the voltage at nodes A and B regardless of which pairs of transistors Q1/Q4 and Q2/Q3 are turned on and which are turned off.

Figure 1:
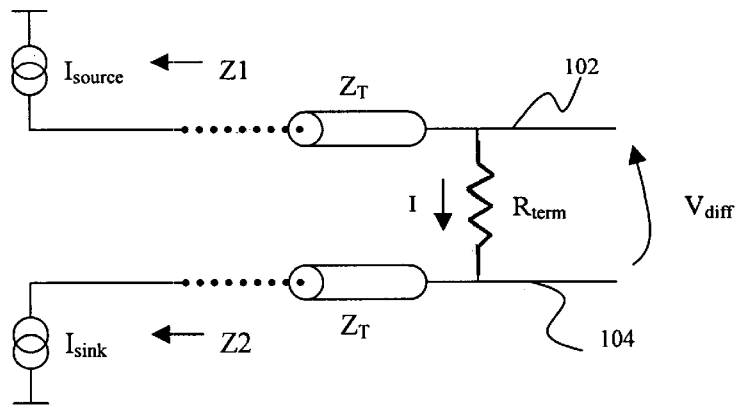
FIG. 1 illustrates the current source and sink model of the low voltage differential driver of the prior art.
Figure 2:
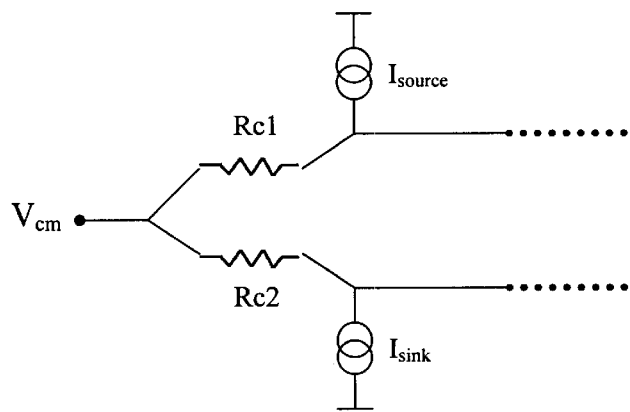
FIG. 2 illustrates a technique for setting common mode voltage in the current source and sink model of the low differential driver of the prior art.
Figure 3:
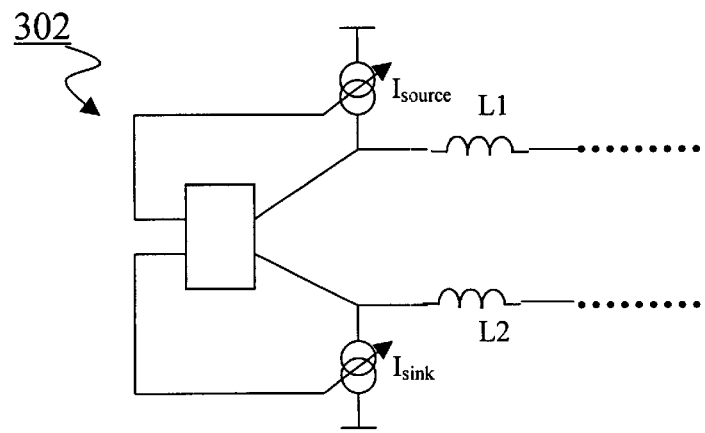
FIG. 3 illustrates a technique for setting common mode driver impedance in the current source and sink model of the low differential driver of the prior art.

Another advantage of the driver 602 of the present invention is that driver output impedance problems discussed in connection with FIG. 3 above, are substantially reduced. In particular, for long transmission lines, because the output impedance is ideally matched with the transmission lines, noise reflections are reduced. For short transmission lines, energy arising from stimulation of the parasitic inductors Lp1 and Lp2, is absorbed by the back termination Rd2 and the parasitic capacitance, thus providing sufficient dampening against ringing on the transmission lines.

Yet another advantage of the present invention is that the resistor Rd2 of this configuration can be used as a termination resistor when the transmission lines are being used for bidirectional signaling. For bidirectional signaling mode, inverters D1, D2, D3, and D4 are driven so as to turn transistors Q1, Q2, Q3 and Q4 off, which leaves a parallel resistance of R term and Rd2 between the true and complement signal lines 102 and 104, and allows the voltage between the lines to float to around to the common mode voltage as established by the generator. Accordingly, Rd2 in this mode acts as a receiver termination resistor $R_{term}$.

Figure 7:
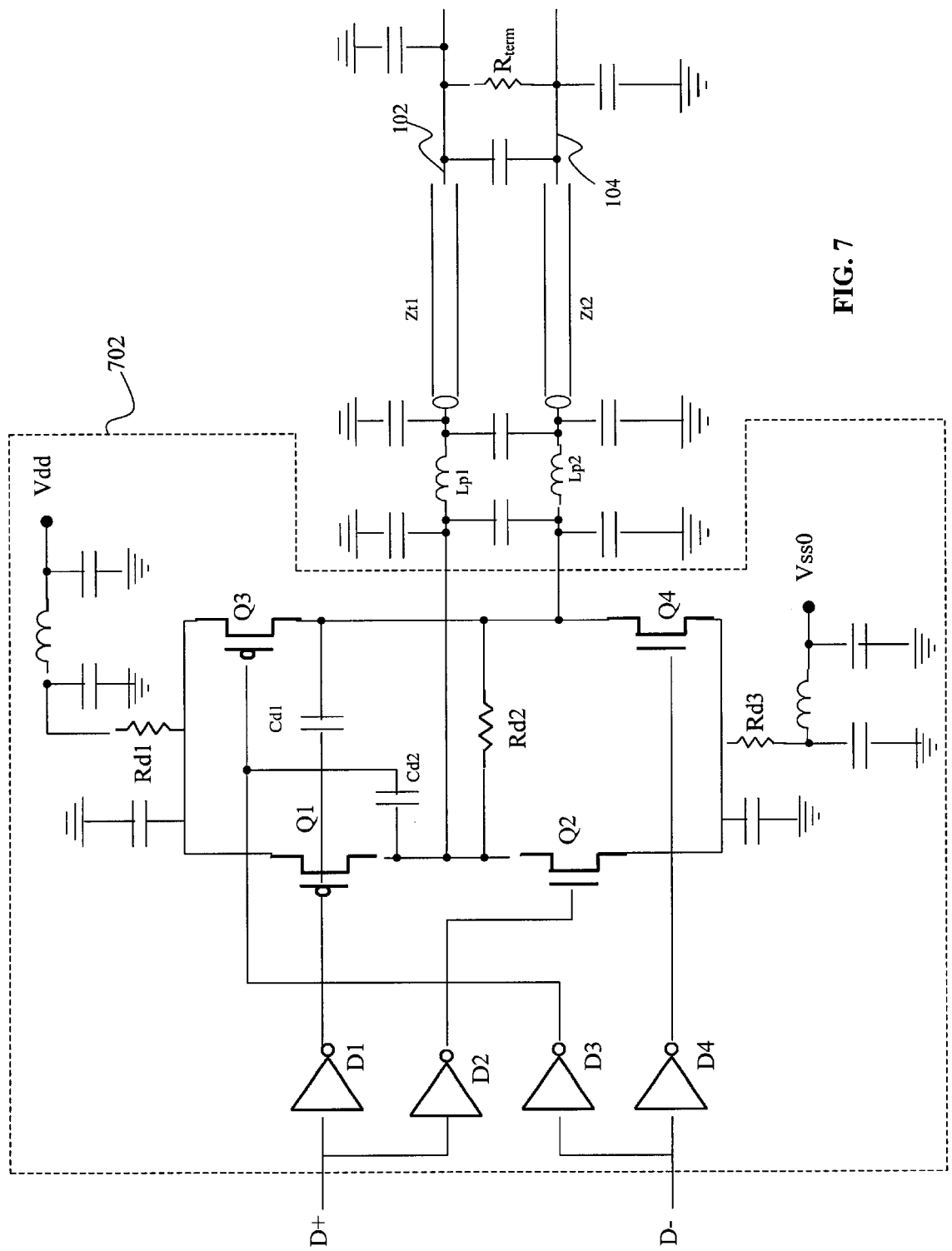
FIG. 7 illustrates another exemplary implementation of the low differential driver of the present invention.

FIG. 7 illustrates another example of an LVDS driver 702 in accordance with the invention. In this example, capacitors Cd1 and Cd2 are further provided to provide extra charge to turn the devices on, thus yielding improved switching speeds.

As shown, capacitor Cd1 is connected between the gate of transistor Q1 and the drain of transistor Q3, and capacitor Cd2 is connected between the gate of transistor Q3 and the drain of transistor Q1. Capacitors Cd1 and Cd2 each have a capacitance of about 1 pF and cause the parasitic capacitances to charge up at lower currents, thus reducing the delay in switching speeds caused by this factor.

FIGS. 8-A and 8-B illustrate alternative models for an LVDS driver in accordance with the invention. In this alternative, additional segments are provided to more easily match the impedance of the driver to the load, for example.

Specifically, as shown in FIG. 8-A, alternate resistances R2a, R2b, and R2c are provided in parallel with R2. The selection of the overall resistance that is used to establish $V_{diff}$ is thus made by controlling the selection signals SEL-a, SEL-b and SEL-c that are connected to the gates of NFETs Qa, Qb and Qc. For example, if all signals SEL-a, SEL-b and SEL-c are set so that NFETs Qa, Qb and Qc turn off, the resistance is simply R2. As another example, if signals SEL-b and SEL-c are set so that NFETs Qb and Qc turn off, while signal SEL-a is set so that NFET Qa turns on, the resistance for establishing $V_{diff}$ is the parallel resistance of R2 and R2a.

As shown in FIG. 8-B, alternate resistances are provided to variably adjust resistances R1 and R3. In this example, R1a is preferably substantially equal to R3a, R1b is preferably substantially equal to R3b and R1c is preferably substantially equal to R3c. Moreover, selection signal SEL-b is commonly connected to the gates of PFET Q1b (through an inverter) and NFET Q3b, and selection signal SEL-c is commonly connected to the gates of PFET Q1c (through an inverter) and NFET Q3c. As should be apparent, therefore, the selection of the overall resistance that is used to establish resistances R1 and R2 is thus simultaneously made by controlling the selection signals SEL-b and SEL-c. For example, if signals SEL-b and SEL-c are set so that PFETs Q1b and Q1c and NFETs Q3b and Q3c turn off, the resistances of R1 and R3 are the sum of R1a, R1b, R1c and R3a, R3b and R3c, respectively. As another example, if signal SEL-c is set so that PFET Q1c and NFET Q3c turn on, while signal SEL-b is set so that PFET Q1b and NFET Q3b turn off, the resistances R1 and R3 are the sum of R1a, R1b and R3a, R3b respectively. While this tuning of the resistors is shown using the addition of series resitors, it could also been done using a combination or parallel resistors.

Although the present invention has been described in detail with reference to the preferred embodiments thereof, those skilled in the art will appreciate that various substitutions and modifications can be made to the examples described herein while remaining within the spirit and scope of the invention as defined in the appended claims.

What is claimed is:

1. A low-voltage differential I/O apparatus, comprising:

means for providing a resistance between a first end and a second end, the first end and the second end being directly connected to first and second transmission lines, respectively;

means for providing a first voltage to a first node, the means including a fixed second resistor in series between a first voltage source and the first node;

means for providing a second voltage to a second node, the means including a fixed third resistor in series between a second voltage source and the second node; and means for selectively coupling the first end to either one of the first and second nodes and the second end to the other of the first and second nodes in accordance with a logic state desired to be signaled on the first and second transmission lines, wherein during signaling of a first logic state, a first polarity of a differential voltage is established between the first and second ends of the resistance by firstly selectively coupling the first end to the first node and the second end to the second node with a minimal resistance between the firstly coupled nodes and ends, the minimal resistance being less than 10% of the resistance, and wherein during signaling of a second logic state, a second opposite polarity of the differential voltage is established between the first and second ends of the resistance by secondly selectively coupling the first end to the second node and the second end to the first node with the minimal resistance between the secondly coupled nodes and ends, such that the magnitude of the differential voltage is substantially the absolute difference between the first voltage and the second voltage provided to the first and second nodes, respectively, during signaling of both the first and second logic states.

2. An apparatus according to claim 1, further comprising:

means for selectively coupling a fixed fourth resistor in series with the fixed second resistor between the first voltage source and the first node; and means for selectively coupling a fixed fifth resistor in series with the fixed third resistor between the second voltage source and the second node.

3. An apparatus according to claim 2, wherein the fixed second resistor and the fixed third resistor are substantially the same.

4. An apparatus according to claim 1, wherein the means for selectively coupling includes a transistor that operates in a triode region of operation only during one of the logic states.

5. An apparatus according to claim 1, wherein the means for selectively coupling includes a transistor that operates in a triode region of operation only during signaling of the logic states such that the differential voltage in both the first and second logic states is substantially a function of a voltage division of the first and second voltage sources between the first, second and third resistances, the polarity of the differential voltage being determined by operation of the selective coupling means.

6. An apparatus according to claim 4, wherein the means for selectively coupling further includes a capacitor coupled to the transistor and arranged so as to reduce delay in switching speeds at lower currents.

7. A low-voltage differential I/O apparatus, comprising:
   means for providing a resistance between a first end and a second end, the first end and the second end being coupled to first and second transmission lines, respectively;
   means for selectively adjusting the resistance between the first and second ends by selectively coupling one or more additional fixed resistors in parallel with the resistance between the first and second ends;
   means for providing a first voltage to a first node;
   means for providing a second voltage to a second node; and
   means for selectively coupling the first end to either one of the first and second nodes and the second end to the other of the first and second nodes in accordance with a logic state desired to be signaled on the first and second transmission lines.

8. A low-voltage differential I/O method, comprising:
   providing a resistance between a first end and a second end, the first end and the second end being directly connected to first and second transmission lines, respectively;
   providing a first voltage to a first node, the step including providing a fixed second resistor in series between a first voltage source and the first node;
   providing a second voltage to a second node, the step including providing a fixed third resistor in series between a second voltage source and the second node; and
   selectively coupling the first end to either one of the first and second nodes and the second end to the other of the first and second nodes in accordance with a logic state desired to be signaled on the first and second transmission lines,
   wherein during signaling of a first logic state, a first polarity of a differential voltage is established between the first and second ends of the resistance by firstly selectively coupling the first end to the first node and the second end to the second node with minimal resistance between the firstly coupled nodes and ends, the minimal resistance being less than 10% of the resistance, and
   wherein during signaling of a second logic state, a second opposite polarity of the differential voltage is established between the first and second ends of the resistance by secondly selectively coupling the first end to the second node and the second end to the first node with minimal resistance between the secondly coupled nodes and ends,
   such that the magnitude of the differential voltage is substantially the absolute difference between the first voltage and the second voltage provided to the first and second nodes, respectively, during signaling of both the first and second logic states.

9. A method according to claim 8, further comprising:
   selectively coupling a fixed fourth resistor in series with the fixed second resistor between the first voltage source and the first node; and
   selectively coupling a fixed fifth resistor in series with the fixed third resistor between the second voltage source and the second node.

10. A method according to claim 9, wherein the fixed second resistor and the fixed third resistor are substantially the same.

11. A method according to claim 8, wherein the step of selectively coupling includes operating a transistor in a triode region of operation only during one of the logic states, the transistor being coupled to one of the first and second nodes.

12. A method according to claim 8, wherein the step of selectively coupling includes operating a transistor in a triode region of operation only during signaling of the logic states, the transistor being coupled to one of the first and second nodes such that the differential voltage in both the first and second logic states is substantially a function of a voltage division of the first and second voltage sources between the first, second and third resistances, the polarity of the differential voltage being determined in accordance with the selective coupling step.

13. An apparatus according to claim 11, wherein the step of selectively coupling further includes coupling a capacitor to the transistor and arranging the capacitor so as to reduce delay in switching speeds at lower currents.

14. A low-voltage differential I/O method, comprising:
   providing a resistance between a first end and a second end, the first end and the second end being coupled to first and second transmission lines, respectively;
   selectively adjusting the resistance between the first and second ends by selectively coupling one or more additional fixed resistances in parallel with the resistance between the first and second ends;
   providing a first voltage to a first node;
   providing a second voltage to a second node; and
   selectively coupling the first end to either one of the first and second nodes and the second end to the other of the first and second nodes in accordance with a logic state desired to be signaled on the first and second transmission lines.

15. A low-voltage differential I/O apparatus, comprising:
   a resistor providing a resistance between a first end and a second end, the first end and the second end being directly connected to first and second transmission lines, respectively;
   first and second voltage sources coupled to first and second nodes, respectively;
   a fixed second resistor coupled in series between the first voltage source and the first node;
   a fixed third resistor coupled in series between the second voltage source and the second node;
   switches coupled between the first and second nodes and the first and second ends of the resistor; and
   a driver coupled to the switches for selectively coupling the first end of the resistor to either one of the first and second nodes and the second end of the resistor to the other of the first and second nodes in accordance with a logic state desired to be signaled on the first and second transmission lines,
   wherein during signaling of a first logic state, a first polarity of a differential voltage is established between the first and second ends of the resistor by selectively coupling the first end to the first node and the second end to the second node with minimal resistance between the firstly coupled nodes and ends, the minimal resistance being less than 10% of a resistance of the resistor, and wherein during signaling of a second logic state, a second opposite polarity of the differential voltage is established between the first and second ends of the resistor by secondly selectively coupling the first end to the second node and the second end to the first node with the minimal resistance between the secondly coupled nodes and ends, such that the magnitude of the differential voltage is substantially the absolute difference between the first voltage and the second voltage provided to the first and second nodes, respectively, during signaling of both the first and second logic states.

16. An apparatus according to claim 15, wherein the switches are comprised of transistors.

17. An apparatus according to claim 15, further comprising:
- a fixed fourth resistor that is selectively coupled in series with the fixed second resistor between the first voltage supply and the first node, so as to selectively adjust the resistance therebetween; and
- a fixed fifth resistor that is selectively coupled in series with the fixed third resistor between the second voltage supply and the second node, so as to selectively adjust the resistance therebetween.

18. An apparatus according to claim 17, wherein the fixed second resistor and the fixed third resistor have substantially the same resistance, and wherein the fixed fourth resistor and the fixed fifth resistor have substantially the same resistance, and wherein the coupling selection of the fixed fourth and fifth resistors with the fixed second and third resistors, respectively, is done in accordance with a common selection signal.

19. An apparatus according to claim 15, wherein the switches include a transistor that operates in a triode region of operation only during a corresponding one of the logic states.

20. An apparatus according to claim 15, wherein the switches include a transistor that operates in a triode region of operation only during signaling of the logic states such that the differential voltage in both the first and second logic states is substantially a function of a voltage division of the first and second voltage sources between the first, second and third resistances, the polarity of the differential voltage being determined by operation of the driver.

21. An apparatus according to claim 19, wherein the switches further includes a capacitor coupled to the transistor and arranged so as to reduce delay in switching speeds at lower currents.

22. A low-voltage differential I/O apparatus, comprising:
- a resistor providing a resistance between a first end and a second end, the first end and the second end being coupled to first and second transmission lines, respectively;
- a second resistor that is selectively coupled in parallel between the first and second ends of the resistor so as to selectively adjust the resistance between the first and second ends;
- first and second voltage sources coupled to first and second nodes, respectively;
- switches coupled between the first and second nodes and the first and second ends of the resistor; and
- a driver coupled to the switches for selectively coupling the first end of the resistor to either one of the first and second nodes and the second end of the resistor to the other of the first and second nodes in accordance with a logic state desired to be signaled on the first and second transmission lines.

* * * * *